(12) United States Patent
Lantz et al.

(10) Patent No.: US 7,454,756 B2
(45) Date of Patent: Nov. 18, 2008

(54) METHOD, APPARATUS AND SYSTEM FOR SEAMLESSLY SHARING DEVICES AMONGST VIRTUAL MACHINES

(75) Inventors: Philip R. Lantz, Cornelius, OR (US); Michael A. Goldsmith, Lake Oswego, OR (US); David J. Cowperthwaite, Hillsboro, OR (US); Kiran S. Panesar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 901 days.

(21) Appl. No.: 10/794,752

(22) Filed: Mar. 5, 2004

(65) Prior Publication Data

US 2005/0198633 A1     Sep. 8, 2005

(51) Int. Cl.
    *G06F 9/46* (2006.01)
(52) U.S. Cl. .............................. 718/108; 718/1; 718/107
(58) Field of Classification Search ................. 718/107, 718/108, 1
    See application file for complete search history.

(56) References Cited

U.S. PATENT DOCUMENTS

| 4,887,202 | A | * | 12/1989 | Tanaka et al. | ................. 703/21 |
| 6,003,065 | A | * | 12/1999 | Yan et al. | .................... 709/201 |
| 6,496,847 | B1 | * | 12/2002 | Bugnion et al. | ................. 718/1 |
| 2002/0049869 | A1 | * | 4/2002 | Ohmura et al. | ................. 710/5 |
| 2002/0173863 | A1 | * | 11/2002 | Imada et al. | .................. 700/83 |
| 2004/0187106 | A1 | * | 9/2004 | Tanaka et al. | .................. 718/1 |

* cited by examiner

*Primary Examiner*—Thomas Lee
*Assistant Examiner*—Jaweed A Abbaszadeh
(74) *Attorney, Agent, or Firm*—D'Ann Naylor Rifai

(57) ABSTRACT

A method, apparatus and system are described for seamlessly sharing I/O devices amongst multiple virtual machines ("VMs") on a host computer. Specifically, according to one embodiment of the invention, the virtual machine manager ("VMM") on the host cycles access to the I/O devices amongst the VMs according to a round robin or other such allocation scheme. In order to provide direct access to the devices, the VMM may save the device state pertaining to the currently active VM, store the state in a memory region allocated to the currently active VM, retrieve a device state for a new VM from its memory region and restore the device using the retrieved device state, thus providing the illusion that each VM has direct, full-speed, exclusive access to the I/O device.

12 Claims, 5 Drawing Sheets

METHOD, APPARATUS AND SYSTEM FOR SEAMLESSLY SHARING DEVICES AMONGST VIRTUAL MACHINES

CROSS-REFERENCE TO RELATED APPLICATION

The present application is related to U.S. patent application Ser. No. 10/794,914, entitled "Method, Apparatus and System for Seamlessly Sharing a Graphics Device Amongst Virtual Machines," assigned to the assignee of the present invention (and filed concurrently herewith).

BACKGROUND

Interest in virtualization technology is growing steadily as processor technology advances. One aspect of virtualization technology enables a single host computer running a virtual machine monitor ("VMM") to present multiple abstractions and/or views of the host, such that the underlying hardware of the host appears as one or more independently operating virtual machines ("VMs"). Each VM may function as a self-contained platform, running its own operating system ("OS") and/or a software application(s). The VMM manages allocation of resources on the host and performs context switching from one VM to another as necessary to cycle between various virtual machines according to a round-robin or other predetermined scheme.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for seamlessly sharing input output ("I/O") devices amongst virtual machines ("VMs") without requiring any changes to the I/O devices and/or to the software running on the VMs. Reference herein to "I/O devices" shall include any and all devices capable of providing input and receiving output from a host computer system including graphics controllers, disk controllers, and/or other input/output devices. Additionally, reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
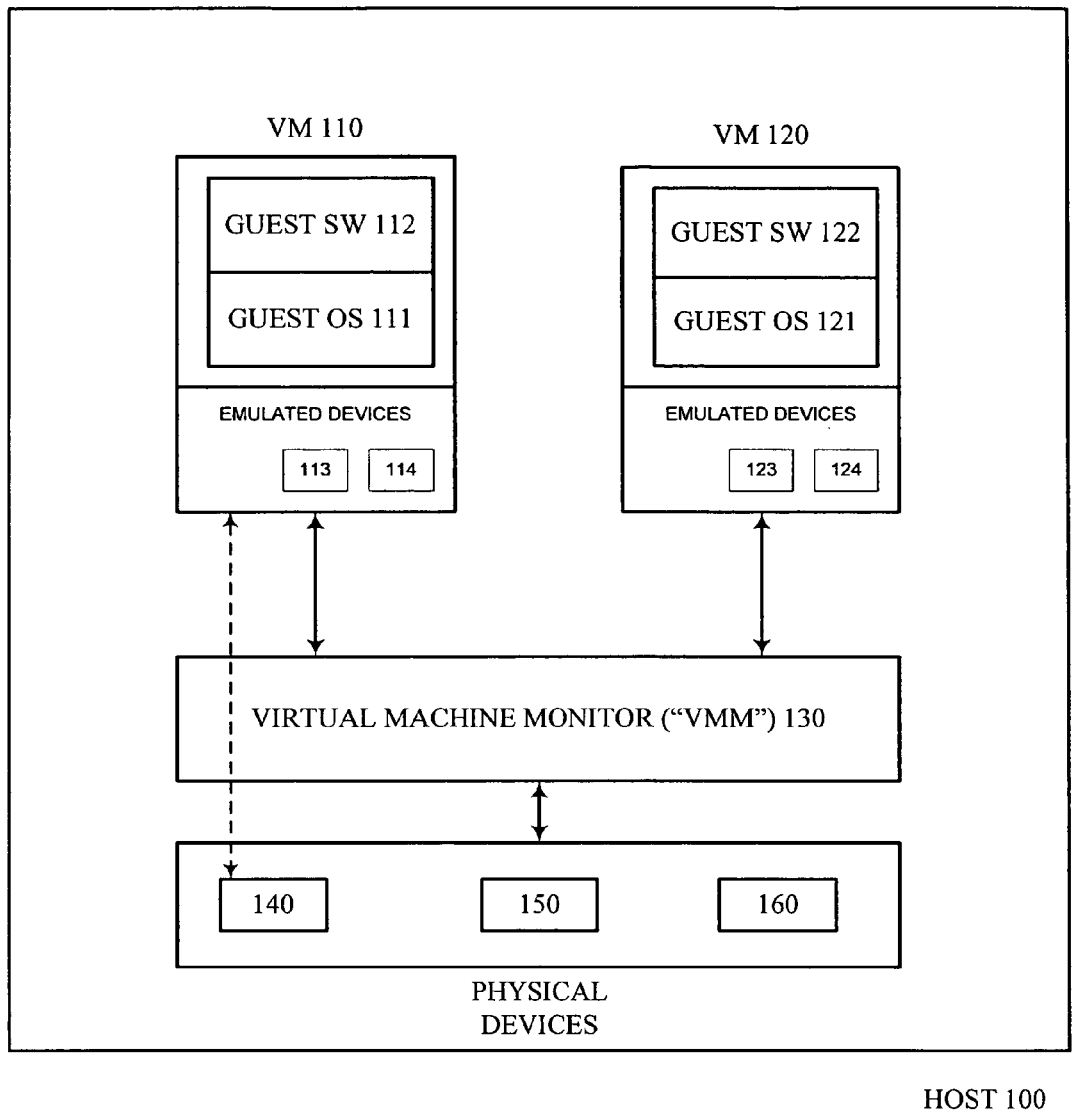
FIG. 1 illustrates an example of a typical virtual machine host.

FIG. 1 illustrates an example of a typical virtual machine host platform ("Host 100"). As previously described, a virtual-machine monitor ("VMM 130") typically runs on the host platform and presents one or more abstractions and/or views of the platform (also referred to as "virtual machines" or "VMs") to other software. Although only two VM partitions are illustrated ("VM 110" and "VM 120", hereafter referred to collectively as "Virtual Machines"), these Virtual Machines are merely illustrative and additional virtual machines may be added to the host. VMM 130 may be implemented in software (e.g., a component of a host operating system), hardware, firmware and/or any combination thereof.

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 122" and "Guest Software 122" and hereafter referred to collectively as "Guest Software"). Each Guest OS and/or Guest Software operates as if it were running on a dedicated computer rather than a virtual machine. That is, each Guest OS and/or Guest Software may expect to control various events and have access to hardware resources on Host 100. In reality, VMM 130 has ultimate control over the events and hardware resources and allocates resources to Guest OS and/or Guest Software as necessary.

Various physical devices ((illustrated conceptually in FIG. 1 as Physical Devices 140, 150, and 160) may also be coupled to Host 100. Allocation of the physical devices to the various Virtual Machines is managed by VMM 130. Currently, VMM 130 may allocate the physical devices to the Virtual Machines by giving a specific Virtual Machine exclusive access to a physical device (e.g., Physical Device 140 to VM 110, as illustrated) and/or by creating and maintaining software instantiations of the physical devices (i.e., emulating the devices) for each of the Virtual Machines. In the former situation, Physical Device 140 is accessible only by VM 110 and is not available to the other Virtual Machines on Host 100 without restarting Guest OS 111 and Guest OS 121 on Host 100.

If a physical device on Host 100 is going to be shared by more than one Virtual Machine at the same time, VMM 130 typically emulates the physical device (i.e., implements a software "copy" of the device for each Virtual Machine), and arbitrates access of the emulated devices to the physical device. In other words, VMM 130 may enable multiple emulated ("virtual") instantiations of the devices, thus allowing each Virtual Machine to seem to have direct access to some set of devices (illustrated conceptually in FIG. 1 as Emulated Devices 113 and 114 on VM 110, corresponding to Physical Device 150 and 160, and Emulated Devices 123 and 124 on VM 120, also corresponding to Physical Device 150 and 160). Although in reality, the Virtual Machines do not have direct access to and/or control of the devices, VMM 130 may manage access to the physical devices according to some predetermined scheme such that the Guest OS and Guest Software in the Virtual Machines are unaware of their lack of direct interaction with the physical devices.

Both schemes described above suffer from a number of limitations. In the former situation where a single Virtual Machine has exclusive access to Physical Device 140, only that Virtual Machine may have access to the device and reallocating the device to another Virtual Machine is a complex task. In the latter situation where emulated devices are provided by VMM 130, the abstraction may increase the overhead and noticeably decrease the performance of Host 100 and/or Physical Device 140. This performance degradation may be crucial for certain types of devices coupled to Host 100. Additionally, due in part to the complexity of emulating in software the various functionality of hardware devices, the software-emulated devices implemented by VMM 130 may have fewer features than the physical device. For example, VMM 130 may implement a software-emulated graphics device that supports only Video Graphics Array ("VGA") capabilities, whereas the physical graphics device may additionally support 3 Dimensional ("3-D") rendering.

Figure 2:
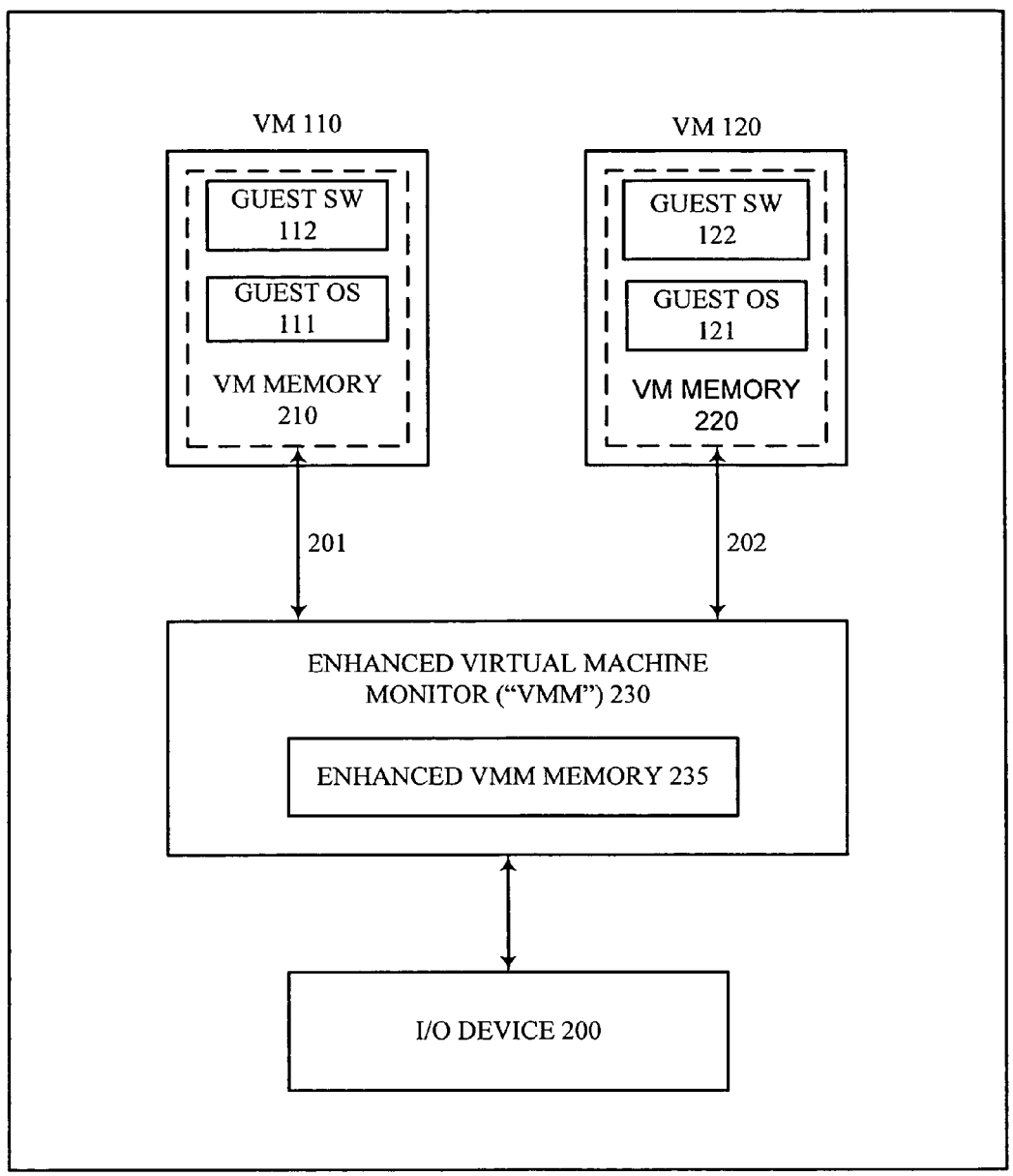
FIG. 2 illustrates a system according an embodiment of the present invention.

According to an embodiment of the present invention, multiple Virtual Machines on a host may directly access and share the full functionality of a single I/O device ("I/O Device 200") coupled to the host. FIG. 2 illustrates a system according to an embodiment of the present invention. As illustrated in FIG. 2, Enhanced VMM 230 may manage access to I/O Device 200 such that each Virtual Machine on Host 100 may directly access the device. The term "Enhanced VMM 230" shall include a VMM enhanced to enable various embodiments of the present invention as described herein. It will be readily apparent to those of ordinary skill in the art that the enhancements may be made to an existing VMM and/or to other elements that may work in conjunction with the VMM. Enhanced VMM 230 may therefore be implemented in software (e.g., as a standalone program and/or a component of a host operating system), hardware, firmware and/or any combination thereof.

Each Virtual Machine may be allocated a portion of Host 100's memory for use by the Guest OS and Guest Software (e.g., as illustrated in FIG. 2, "VM Memory 210" may be assigned to VM 110 and "VM Memory 220" may be assigned to "VM 120"). Additionally, Enhanced VMM 230 may also be allocated an area of memory on Host 100 (illustrated in FIG. 2 as "Enhanced VMM Memory 235" and illustrated in further detail in FIG. 3). For the purposes of this specification, the term "memory" may comprise Host 100's cache, main memory, hard disk and/or any other storage medium. In one embodiment, Enhanced VMM 230 may associate portions of Enhanced VMM Memory 235 to specific Virtual Machines to enable storing and/or retrieval of the execution state information for I/O Device 200 (e.g., as illustrated in FIG. 3, "VMM Memory 310" may be associated with VM 110 and "VMM Memory 320" may be associated with VM 120").

In one embodiment, Enhanced VMM 230 may store and retrieve the execution state of I/O Device 200 for each Virtual Machine as it switches rapidly between the Virtual Machines (e.g., on the order of hundreds of times per second). The rate at which Enhanced VMM 230 switches between the Virtual Machines may be configurable without departing from the spirit of embodiments of the present invention. As Enhanced VMM 230 prepares to switch from VM 110 (i.e., the currently active Virtual Machine, illustrated by 201) to VM 120 (illustrated by 202), in one embodiment of the present invention, Enhanced VMM 230 idles I/O Device 200 (i.e., causes the device to complete all pending operations for VM 110 and stop further interaction with VM 110), and saves the state of the device with respect to VM 110 in VMM Memory 310, then loads the state of I/O Device 200 with respect to VM 120 from VMM Memory 320 and restarts I/O Device 200, now in the context of VM 120. If VM 120 has not previously run (i.e., there is no previous I/O Device 200 state that exists specific to VM 120), the initial startup state of I/O Device 200 may be utilized instead. By switching access to I/O Device 200 rapidly, the Virtual Machines on Host 100 may be unaware that I/O Device 200 is being continuously reassigned to different Virtual Machines.

Figure 3:
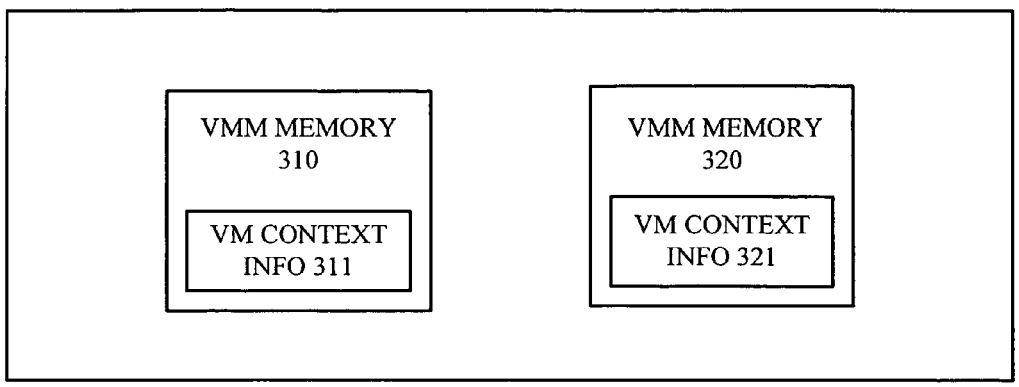
FIG. 3 illustrates conceptually the contents of the memory allocated to Enhanced VMM 230.

FIG. 3 illustrates conceptually the relevant portions of the contents of Enhanced VMM Memory 235, i.e., VMM Memory 310 and VMM Memory 320. VMM Memory 310 may include VM Context Info 311 (corresponding to I/O Device 200 state information with respect to VM 110) while VMM Memory 320 may include VM Context Info 321 (corresponding to I/O Device 200 state information with respect to VM 120). Thus, in the example described above, in order to switch from VM 110 to VM 120, Enhanced VMM 230 may idle I/O Device 200 and save the state of I/O Device 200 with respect to VM 120 as VM Context Info 311 in VMM Memory 310. Enhanced VMM 230 may also load VM Context Info 321, i.e., the state of I/O Device 200 with respect to VM 120, from VMM Memory 320 and restart I/O Device 200 (i.e., cause the device to start and/or resume work on behalf of VM 120). This effectively switches I/O Device 200 from VM 110 to VM 120, and Enhanced VMM 230 may rapidly cycle between the Virtual Machines (e.g., VM 110 and VM 120) such that each Virtual Machine may appear to have complete control over I/O Device 200.

Figure 4:
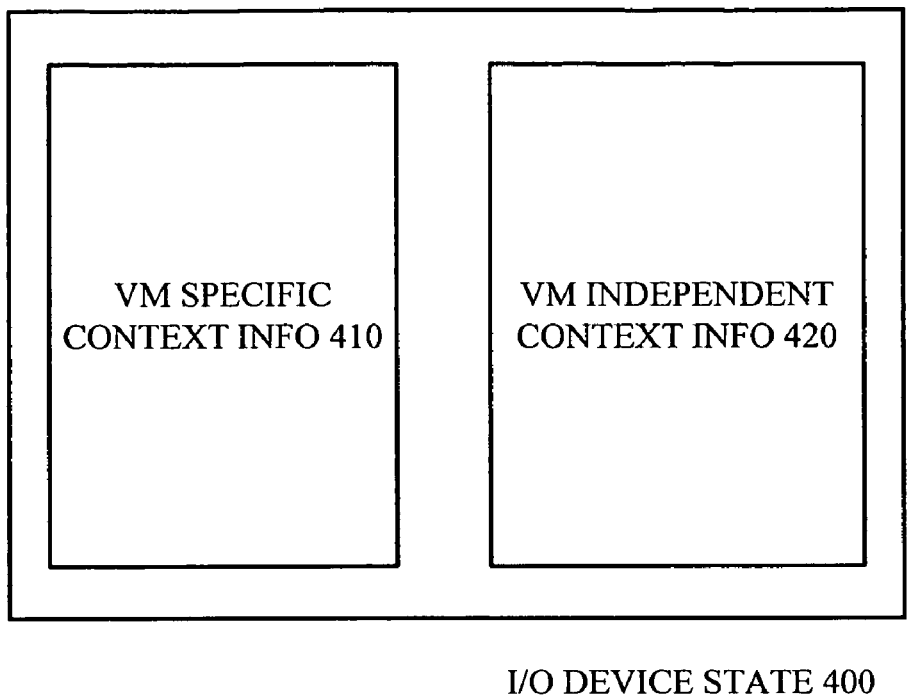
FIG. 4 illustrates conceptually the state of I/O Device 200.

According to one embodiment of the present invention, only a portion of the device state information with respect to a particular Virtual Machine may be stored and/or retrieved. Portions of the state information pertaining to I/O Device 200 may remain unchanged between Virtual Machines. FIG. 4 illustrates conceptually the state of I/O Device 200 ("I/O Device State 400"). As illustrated, I/O Device State 400 may include various types of information, including VM specific context information ("VM Specific Context Info 410"), collectively corresponding to VM Context Info 311 and VM Context Info 321 in Enhanced VMM Memory 235, and VM independent context information ("VM Independent Context Info 420"). VM Independent Context Info 420 may not be stored to and/or retrieved from Enhanced VMM Memory 235, and instead, this information may be retained by I/O Device 200 because it does not change as the device is reassigned from one Virtual Machine to another. In an alternate embodiment, all the device state information with respect to a particular Virtual Machine may be stored and/or retrieved.

In one embodiment of the present invention, the above described storing and retrieving of I/O device state information may occur in synch with the other resources allocation performed by Enhanced VMM 230. Thus, for example, Enhanced VMM 230 may perform its typical resource allocation amongst the Virtual Machines on Host 100 according to the same schedule as switching Virtual Machine access to I/O Device 200. By giving various Virtual Machines on Host 100 access to I/O Device 200 according to a predetermined scheme as described, all the Virtual Machines on Host 100 may directly access the full functionality of I/O Device 200. As a result, each Virtual Machine is able to take advantage of the full performance capabilities of I/O Device 200.

In one embodiment, to save the state of I/O Device 200, Enhanced VMM 230 may read and save various device configuration values from I/O Device 200's registers and/or issue a command to I/O Device 200 that instructs it to save its state in a specific memory area (e.g., VMM Memory 310 and/or VMM Memory 320). This information may be later retrieved in the reverse, i.e., by reading the various device configuration values from the specific memory area and/or by issuing a command to I/O Device 200 that instructs it to load its state from the specific memory area. Depending on the type of device, Enhanced VMM 230 may need to intercept certain events and/or actions between the VM and I/O Device 200. These events and/or actions may differ from device to device and further description thereof is omitted herein in order not to unnecessarily obscure embodiments of the present invention.

Figure 5:
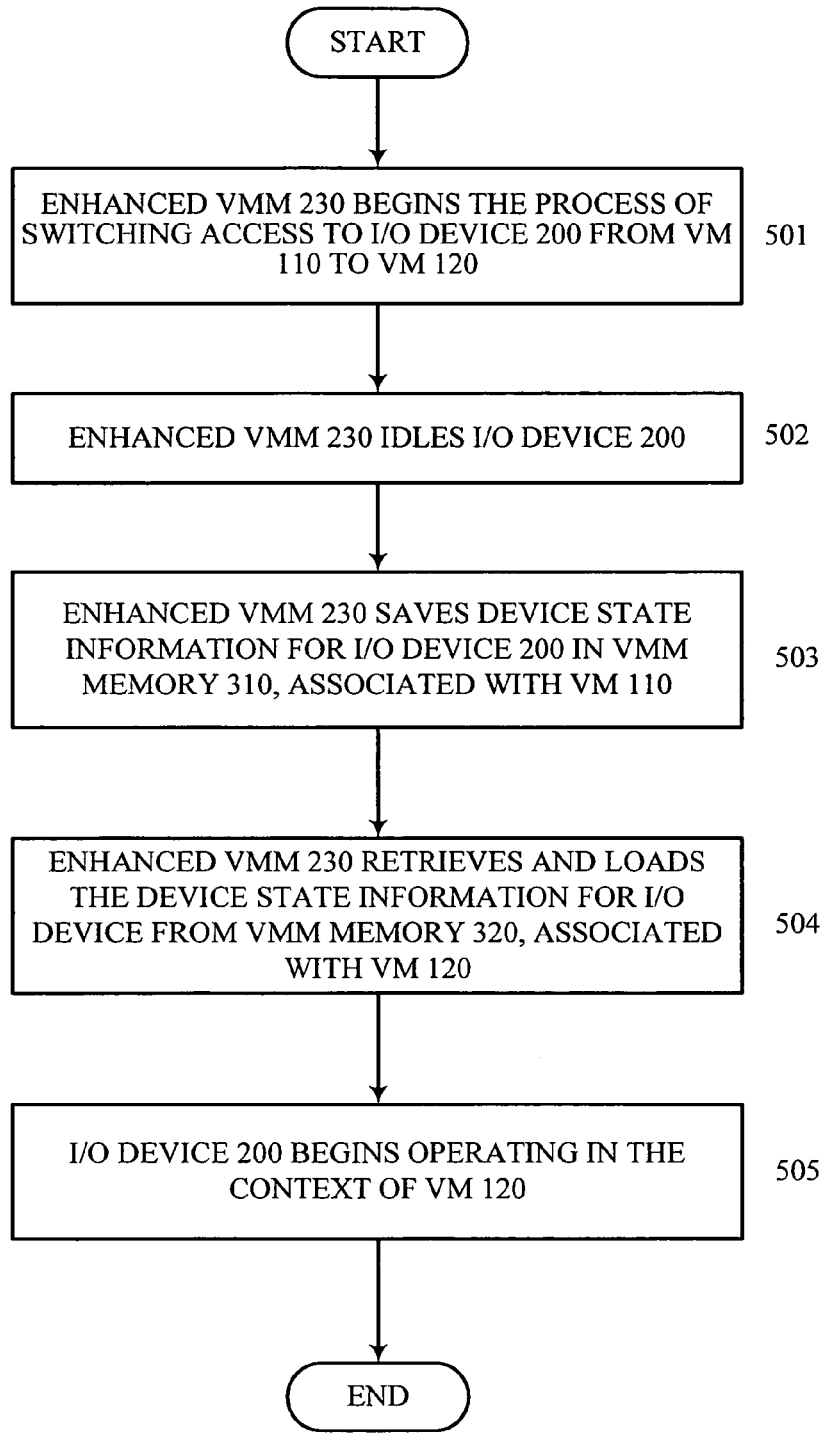
FIG. 5 is a flowchart illustrating an embodiment of the present invention.

FIG. 5 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 501, Enhanced VMM 230 may begin the process of switching access to I/O Device 200 from VM 110 to VM 120. Accordingly, Enhanced VMM 230 may in 502 idle I/O Device 200 and save the device state to VMM Memory 310 in 503. The device state may comprise all the information for the device or a subset of information pertaining only to VM 110. In 504, Enhanced VMM 230 may then retrieve and load I/O Device 200's previously stored device state associated with VM 120 from VMM Memory 320. If the device has no state associated with VM 120 yet (e.g., the first time Enhanced VMM 230 assigns the device to VM 120), the device state may represent the startup state of the device. In 505, I/O Device 200 begins operating in the context of VM 120.

The hosts according to embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores and/or transmits information in any form accessible by a computing device, the machine-accessible medium including but not limited to, recordable/non-recordable media (such as read-only memory (ROM), random-access memory (RAM), magnetic disk storage media, optical storage media and flash memory devices), as well as electrical, optical, acoustical or other form of propagated signals (such as carrier waves, infrared signals and digital signals).

According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the bus controller. For example, user input devices may be included in the computing device for providing input data and a display device may be coupled to the USB to enable output to be displayed. In alternate embodiments, the host bus controller may be compatible with various other interconnect standards including PCI, PCI Express, FireWire and/or other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for sharing a physical device amongst at least first and second virtual machines ("VMs") in a processing system, the method comprising:
    configuring the processing system to enable the first VM to directly access the physical device and to utilize full functionality of the physical device;
    a predetermined time after configuring the processing system to enable the first VM to directly access the physical device and to utilize full functionality of the physical device, performing operations comprising:
        idling the physical device by causing the physical device to complete all pending operations for the first VM and temporarily preventing further interactions between the first VM and the physical device,
        saving device state pertaining to the first VM from registers in the physical device to a first memory region associated with the first VM,
        loading device state pertaining to the second VM from a second memory region associated with the second VM to the registers in the physical device, and
        restarting the physical device to enable the second VM to directly access the physical device and to utilize full functionality of the physical device;
    a predetermined time after restarting the physical device for the second VM, performing operations comprising:
        idling the physical device,
        saving device state pertaining to the second VM from registers in the physical device to the second memory region associated with the second VM,
        reloading the saved device state pertaining to the first VM from the first memory region to the registers in the physical device, and
        restarting the physical device to enable the first VM to directly access the physical device and to utilize full functionality of the physical device;
    suspending the first VM prior to loading the device state for the second VM;
    suspending the second VM prior to loading the device state for the first VM; and
    periodically repeating the operations of idling the physical device, saving device state for a current VM, reloading device state for a next VM, and restarting the physical device to enable the next VM to directly access the physical device and to utilize full functionality of the physical device, according to a round robin schedule for the first and second VMs, wherein the predetermined times correspond to a configurable rate for switching between VMs.

2. A method according to claim 1, wherein the operation of saving device state pertaining to the first VM from registers in the physical device comprises:
    saving VM-specific context information from the physical device, but not saving VM-independent context information from the physical device.

3. A method according to claim 1, wherein the physical device comprises an input/output (I/O) device.

4. A method according to claim 1, wherein:
    the first and second memory regions comprise areas of storage controlled by a virtual machine monitor (VMM) in the processing system.

5. An apparatus, comprising:
    a tangible, machine-accessible medium; and
    instructions in the machine-accessible medium, wherein the instructions, when executed by a processing system, result in operations comprising:

configuring the processing system to enable a first virtual machine (VM) in the processing system to directly access a physical device in the processing system and to utilize full functionality of the physical device;

a predetermined time after configuring the processing system to enable the first VM to directly access the physical device and to utilize full functionality of the physical device, performing operations comprising:

idling the physical device by causing the physical device to complete all pending operations for the first VM and temporarily preventing further interactions between the first VM and the physical device, saving device state pertaining to the first VM from registers in the physical device to a first memory region associated with the first VM, loading device state pertaining to a second VM from a second memory region associated with the second VM to the registers in the physical device, and restarting the physical device to enable the second VM to directly access the physical device and to utilize full functionality of the physical device;

a predetermined time after restarting the physical device for the second VM, performing operations comprising:

idling the physical device, saving device state pertaining to the second VM from registers in the physical device to the second memory region associated with the second VM, reloading the saved device state pertaining to the first VM from the first memory region to the registers in the physical device, and restarting the physical device to enable the first VM to directly access the physical device and to utilize full functionality of the physical device;

suspending the first VM prior to loading the device state for the second VM;

suspending the second VM prior to loading the device state for the first VM; and periodically repeating the operations of idling the physical device, saving device state for a current VM, reloading device state for a next VM, and restarting the physical device to enable the next VM to directly access the physical device and to utilize full functionality of the physical device, according to a round robin schedule for the first and second VMs, wherein the predetermined times correspond to a configurable rate for switching between VMs.

6. An apparatus according to claim 5, wherein the operation of saving device state pertaining to the first VM from registers in the physical device comprises:

saving VM-specific context information from the physical device, but not saving VM-independent context information from the physical device.

7. An apparatus according to claim 5, wherein the physical device comprises an input/output (I/O) device.

8. An apparatus according to claim 5, wherein the first and second memory regions comprise areas of storage controlled by a virtual machine monitor (VMM) in the processing system.

9. A processing system, comprising:

a processor;

a physical device responsive to the processor;

a tangible, machine-accessible medium responsive to the processor; and instructions in the machine-accessible medium, wherein the instructions, when executed by the processing system, result in operations comprising:

configuring the processing system to enable a first virtual machine (VM) in the processing system to directly access the physical device and to utilize full functionality of the physical device;

a predetermined time after configuring the processing system to enable the first VM to directly access the physical device and to utilize full functionality of the physical device, performing operations comprising:

idling the physical device by causing the physical device to complete all pending operations for the first VM and temporarily preventing further interactions between the first VM and the physical device, saving device state pertaining to the first VM from registers in the physical device to a first memory region associated with the first VM, loading device state pertaining to a second VM from a second memory region associated with the second VM to the registers in the physical device, and restarting the physical device to enable the second VM to directly access the physical device and to utilize full functionality of the physical device;

a predetermined time after restarting the physical device for the second VM, performing operations comprising:

idling the physical device, saving device state pertaining to the second VM from registers in the physical device to the second memory region associated with the second VM, reloading the saved device state pertaining to the first VM from the first memory region to the registers in the physical device, and restarting the physical device to enable the first VM to directly access the physical device and to utilize full functionality of the physical device;

suspending the first VM prior to loading the device state for the second VM;

suspending the second VM prior to loading the device state for the first VM; and periodically repeating the operations of idling the physical device, saving device state for a current VM, reloading device state for a next VM, and restarting the physical device to enable the next VM to directly access the physical device and to utilize full functionality of the physical device, according to a round robin schedule for the first and second VMs, wherein the predetermined times correspond to a configurable rate for switching between VMs.

10. A processing system according to claim 9, wherein the operation of saving device state pertaining to the first VM from registers in the physical device comprises:

saving VM-specific context information from the physical device, but not saving VM-independent context information from the physical device.

11. A processing system according to claim 9, wherein the physical device comprises an input/output (I/O) device.

12. A processing system according to claim 9, wherein the first and second memory regions comprise areas of storage controlled by a virtual machine monitor (VMM) in the processing system.

* * * * *